United States Patent Office 2,753,521
Patented July 3, 1956

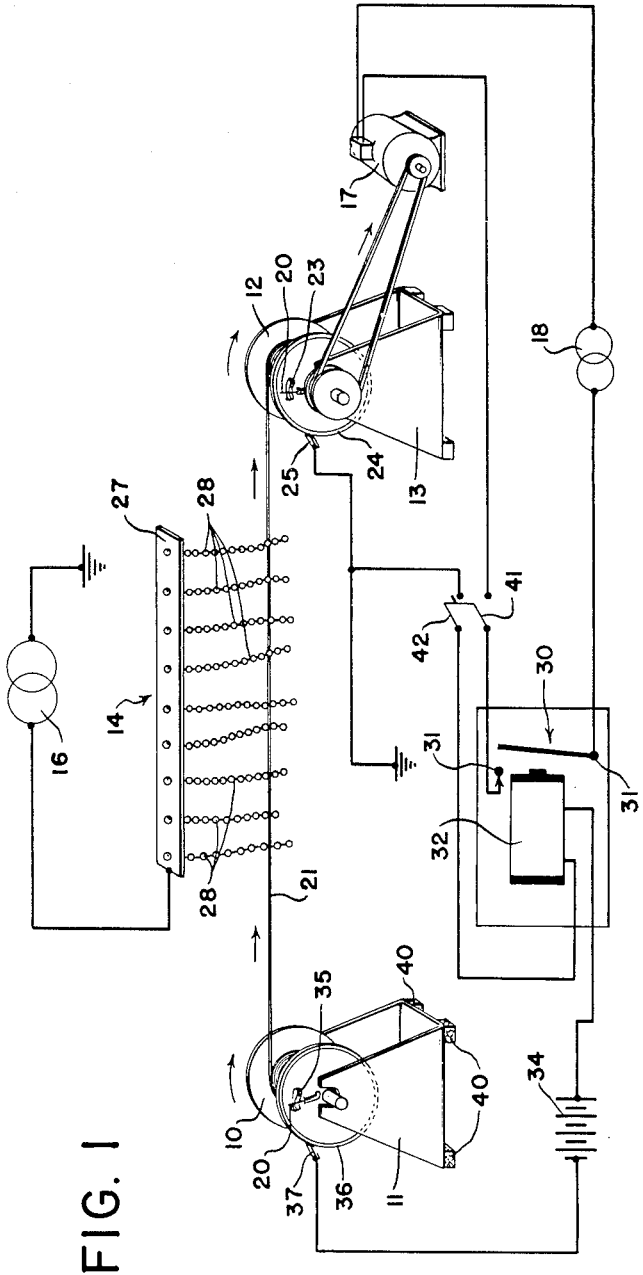
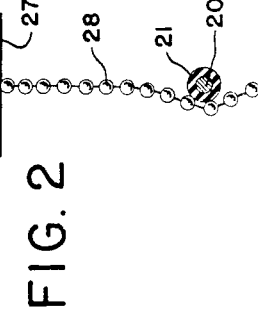
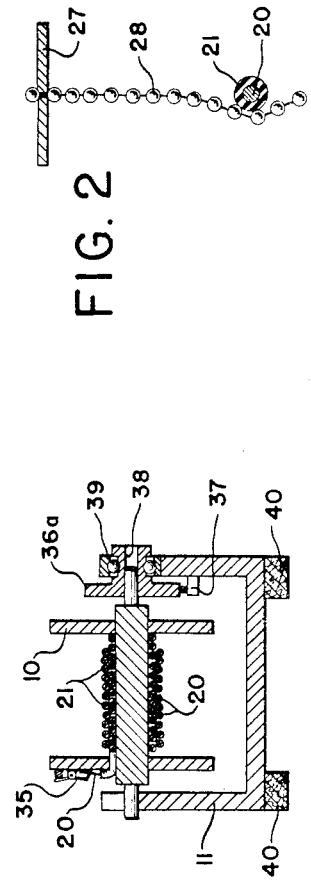

2,753,521

WIRE INSULATION TEST APPARATUS

Michael Abrams, Ardsley, N. Y., assignor to Anaconda Wire and Cable Company, a corporation of Delaware Application November 19, 1954, Serial No. 469,954

5 Claims. (Cl. 324—54)

This invention relates to apparatus for testing the insulation of insulated electric wire. In particular, it relates to means for preventing operation of such apparatus under conditions that might result in an unreliable test of the wire insulation.

The insulation of insulated electric wire must be without defects such as pin holes, breaks, voids or thin spots if the insulation is to prevent short circuits between adjacent insulated conductors or between the insulated conductor and ground when the wire is placed in service. Accordingly, in the manufacture of insulated wire, it is customary to test the wire in order to detect such defects in the insulation before the insulation has the opportunity to fail in service. One of the common tests of wire insulation is to apply a voltage across the insulation many times higher than that which will be encountered in the service life of the wire. Any defect in the wire insulation which might subsequently cause trouble is immediately indicated in this high voltage test procedure by the flow of an electric current through the insulation at the defect therein.

To subject wire insulation to a high voltage test, spark testing apparatus is commonly employed. Spark testing apparatus usually comprises a pay-off reel from which the insulated wire is unwound and a take-up reel upon which the wire is wound while the wire is being tested, a sparker device disposed between the pay-off reel and the take-up reel in the path of travel of the insulated wire between these two reels, connector means adapted to be connected to one end of the conductor of the insulated wire, and a source of high voltage electricity connected to the sparker device and the connector means. An electric motor connected to the take-up reel draws the insulated wire from the pay-off reel to the take-up reel during the course of the test. To test the insulation of the wire, the connector means is connected to one end of the wire to be tested and the electric motor is energized so that there will be a high test voltage across the insulation of the wire as the wire is drawn by the electric motor through the sparker device. Any break or other defect in the insulation of the wire will thereupon be indicated by a spark between the conductor of the wire and the sparker device at the point in the insulation where the defect occurs. Having located the defect in the insulation in this manner the defect can be corrected or cut out, or the entire length of wire may be discarded, as required.

It is apparent that the high voltage test of the wire insulation will be reliable only if a good electric connection is established between the high voltage source and the conductor of the insulated wire. To insure a good connection, insulation is removed from one end of the conductor and the bare conductor is electrically connected by a spring clamp or a similar connector means to one side of the source of high voltage electricity. Occasionally, however, the connection is defective due to carelessness on the part of the test operator, or due to some other cause, and a length of wire having defective insulation is passed through the test apparatus without any indication that its insulation is defective. The unreliable test results obtained in such cases have been the source of a great deal of concern in the wire manufacturing industry.

I have now devised a simple and effective means for avoiding unreliable test results with high voltage spark testing apparatus of the type described due to a defective connection between the high voltage source and the conductor of the insulated wire being tested. My invention comprises essentially an interlock device that prevents operation of the electric motor of the spark test apparatus in the event that there is an imperfect connection between the high voltage source and the conductor of the insulated wire. The apparatus of my invention comprises, in combination with the pay-off reel, take-up reel, sparker device, high voltage source, first connector means for connecting the high voltage source to one end of the insulated wire, and motor means for drawing the insulated wire through the sparker device of the spark test apparatus, of a relay having normally open electric contacts and an electric coil adapted to close the contacts when the coil is energized, a source of electricity for energizing the coil of the relay, and second connector means adapted to be connected to the other end of the conductor of the insulated wire. The source of power for the motor means is electrically connected to the electric motor through the normally open contacts of the relay. The first connector means is electrically connected to the second connector means through the relay power source and the coil of the electric relay. This arrangement of elements prevents operation of the electric motor which draws the insulated wire through the sparker device unless there is a good electric connection between the ends of the conductor of the insulated wire and the two connector means connecting the conductor to the coil of the relay. Consequently, the motor cannot be operated and the high voltage test of the insulation cannot be performed unless there is a good electric contact between the conductor of the insulated wire and the high voltage test circuit.

An embodiment of my high voltage test apparatus is shown in the drawings of which—

Fig. 1 is a view of an advantageous arrangement of the mechanical components of my apparatus, showing schematically the several electrical circuits associated therewith;

Fig. 2 is a section through an advantageous form of sparker device used in the apparatus; and Fig. 3 is a sectional view through a pay-off reel and pay-off reel stand of suitable construction for use in my apparatus.

High voltage spark test apparatus for testing the soundness of the insulation of insulated electric wire, to which apparatus my invention relates, is shown in Fig. 1 of the drawing. The apparatus comprises essentially a pay-off reel 10 rotatably mounted on a pay-off reel stand 11, a take-up reel 12 rotatably mounted on a take-up reel stand 13, a sparker device 14 disposed between the pay-off reel and the take-up reel, connector means on the take-up reel 12 adapted to be electrically connected to one end of the metal conductor of the wire being tested, a source of high voltage electricity 16 electrically connected to the sparker device 14 and to the connector means on the take-up reel 12, motor means 17 for rotating the take-up reel 12, and a source of power 18 for the motor means 17.

The insulated wire to be tested comprising a metal conductor 20 surrounded by a layer of insulation 21 is initially wound about the pay-off reel 10. The outer or forward end of the insulated wire is led through the sparker device 14 and is connected to the take-up reel 12 by means of the connector means thereon. The connector means may be of any suitable construction adapted to establish a good electric connection between the conductor 20 and the high voltage source 16. Advantageously, it comprises a spring clip connector member 23 affixed to the take-off reel 12 and adapted to grip securely the bared conductor 20 at the end of the wire, a slip ring 24 electrically connected to the spring clip 23 and mounted to rotate with the take-up reel 12, and a stationary take-up reel brush 25 in contact with the take-up reel slip ring 24.

The electric connection between the high voltage source 16 and the brush 25 of the connector means is preferably made through ground as shown in Fig. 1. This is done so that the electric potential of the take-up reel and its appurtenances will always be at that of ground with consequent lessening of the hazard of shock to persons in the vicinity of the take-up reel. In such cases it is evident that the conductor 20 and the adjacent inner surface of the insulation 21 also are at approximately ground potential when the conductor 20 is connected to the spring clamp 23.

The sparker device 14, which is electrically connected to the high voltage source 16, is adapted to apply the high potential of this source to the outer surface of the insulation 21. Advantageously, the sparker device comprises a bus member 27 from which depend a plurality of contactor elements 28. The contactor elements 28 shown in the drawing comprise short lengths of metal chain, such as linked ball chain. Each of the lengths of metal chain 28 are disposed in the path of travel of the insulated wire being drawn by the motor means 17 from the pay-off reel 10 to the take-up reel 12. As shown in Fig. 2, the links of the chain 28 bear against the outer surface of the insulated wire as it travels through the sparker device, thus establishing a high potential difference (e. g. 8,000 to 10,000 volts) across the wire insulation 21 which will cause a spark to jump between the sparker device 14 and the wire conductor 20 whenever the insulation is defective.

As each length of insulated wire that is to be tested in the high voltage test apparatus must be connected to the high voltage source 16 at the start of the test, the reliability of the test depends upon the soundness of the electric connection between the metal conductor 20 of the insulated wire and the spring clip connector member 23. There exists the possibility that the electric connection between the conductor 20 and the connector member 23 will be defective for any one of a number of reasons and that, in spite of this defective connection, the wire will be drawn through the test apparatus and approved as meeting specifications, although the insulation of the wire may in fact be defective. To prevent the occurrence of such unreliable tests due to an imperfect electric contact between the metal conductor 20 and the connector member 23, I have devised an interlock mechanism which prevents operation of the electric motor 17 unless the connection between the wire and the connector member is electrically sound.

My interlock mechanism comprises a relay 30 having spring biased normally open electric contacts 31 and an electric coil 32 adapted to close the contacts 31 when the coil is energized. Connector means adapted to be electrically connected to the bared end of the metal conductor 20 of the insulated wire are disposed at the pay-off reel 10. A source of power 34 is provided for energizing the relay coil 32, the power source 34 advantageously being a low voltage D. C. battery. One side of the contacts 31 of the relay is connected to the electric motor 17 and the other side of the relay contacts 31 is connected to the source of power 18 for the electric motor. One side of the coil 32 is connected to the connector means at the pay-off reel 10 and the other side of the coil 32 is connected to the connector means at the take-up reel 12. The battery 34 is connected in series between the coil 32 and the connector means at the pay-off reel 10.

The connector means at the pay-off reel 10 advantageously comprises a spring clip connector member 35 affixed to the pay-off reel and adapted to grip securely the bared inner or rearward end of the wire conductor 20, a slip ring 36 electrically connected to the spring clip 35 and mounted to rotate with the pay-off reel 10, and a stationary pay-off reel brush 37 in contact with the pay-off reel slip ring 36. A modification of the connector means described is shown in Fig. 3 wherein the slip ring 36a is affixed to a reel shaft socket 38 forming the inner race of a ball bearing 39. With the latter construction, a pay-off reel of conventional design can be mounted on and removed from the pay-off reel stand 11 without interference with the contact between the slip ring 36a and the brush 37.

It will be seen from the foregoing description that there are three electrical circuits in my test apparatus. These three circuits are the high voltage test circuit in which the high voltage source 16 is connected to the sparker device 14 and to the take-up reel connector member 23, the motor supply circuit in which a source of, say, 110 or 220 volts A. C. is connected to the electric motor 17 through the normally open contacts 31 of the relay 30, and the relay or interlock circuit in which the relay battery 34 is connected through the coil 32 of the relay to the two connector members 23 and 35 of my test apparatus.

The motor supply circuit can be completed and the motor 17 energized only if the normally open contacts 31 of the relay 30 are closed. The contacts of the relay 30 are closed only when the coil 32 is energized which, in turn, can occur only upon completion of the relay circuit between the two connector members 23 and 35. Completion of the relay circuit is accomplished by establishing good electric contact between the two connector members 23 and 35 and the two ends of the metal conductor 20 of an insulated wire undergoing test. Establishment of this good electric contact permits energization of the electric motor 17 and at the same time insures that the high voltage source 16 is electrically connected to the conductor 20 of the wire undergoing test.

To prevent the occurrence of an unreliable test with my test apparatus, it is essential that the only electric connection between the connector member 23 on the take-up reel and the connector member 35 on the pay-off reel be through the coil 32 of the relay and through the conductor 20 of the insulated wire being tested. Accordingly, when the connector means at the take-up reel is electrically connected to ground as described hereinabove, the connector means at the pay-off reel must be insulated from ground. In such case insulator means 40 are provided to insulate from ground the pay-off reel 10 and stand 11 and the connector means associated therewith.

A motor control switch 41 is provided in the motor supply circuit to control the operation of the electric motor 17. Similarly, a relay control switch 42 is provided in the relay circuit to control the energization of the coil 32 of the relay after the connector members 23 and 35 have been connected to the respective ends of the wire conductor 20. Advantageously, the motor control switch and the relay control switch are combined in a double pole single throw switch so that the energization of the coil 32 of the relay and of the motor 17 will occur substantially simultaneously.

In performing a test of the insulation of an insulated wire, a pay-off reel 10 upon which is wound the wire to be tested is placed on the pay-off reel stand 11. The outer or forward end of the wire to be tested is bared of its insulation and the bare conductor 20 is then connected to the connector member 23 on the take-up reel 12. Similarly, the bared inner or rearward end of the conductor 20 of the wire is connected to the connector member 35 on the pay-off reel 10. The double pole combined motor and relay control switch is then closed.

If the electric contact between the ends of the conductor 20 of the insulated wire and the connector members 23 and 35 is sound, the coil 32 of the relay becomes energized, closing the normally open contacts 31 of the relay and thus energizing the motor 17 mechanically connected to the take-up reel 12. If, on the other hand, the electric contact between the connector members and the ends of the metal conductor is defective, the coil of the relay is not energized and the motor circuit remains open. In the latter event, the failure of the motor to operate indicates an imperfect connection at one or the other of the contactor members 23 or 35 that must be corrected before the test of the insulation can be carried out.

If the electric contact between the ends of the conductor 20 and the contact members 23 and 35 is sound a good electric connection will also be established between the high voltage source 16 and the wire conductor 20. When the motor 17 is energized, the take-up reel 12 rotates and draws the insulated wire by the contactor elements 28 of the sparker device 14. As the wire passes in contact with the contactor elements 28, any defects in the insulation of the wire will be evidenced by a spark jumping between the contactor elements and the metal conductor 20 of the wire. Having located defects in the insulation 21 in this manner, the defective wire can be repaired or rejected as conditions require.

I claim:

1. In apparatus for testing the insulation of insulated wire comprising a sparker device, first connector means adapted to be connected to one end of the metal conductor of the insulated wire, a high voltage source one side of which is electrically connected to the sparker device and the other side of which is electrically connected to said connector means, motor means for drawing the insulated wire through the sparker device, and a source of power for the motor means, the improvement which comprises a relay having normally open electric contacts and an electric coil adapted to close said contacts when said coil is energized, a source of power for the coil of said relay, and a second connector means adapted to be electrically connected to the other end of the metal conductor of the insulated wire, said source of power for the motor means being electrically connected to said motor means through the normally open electric contacts of said relay, said first connector means being electrically connected to said second connector means through the electric coil of said relay, and said source of electric power for the coil of said relay being connected in series between said coil and one of said connector means, whereby operation of the motor means is permitted only when a good electric contact is established between the two connector means and the ends of the metal conductor of the insulated wire respectively.

2. In apparatus for testing the insulation of insulated wire comprising a take-up reel upon which the wire is wound while being tested, a sparker device, first connector means adapted to be electrically connected to one end of the conductor of the insulated wire, a high voltage source one side of which is electrically connected to the sparker device and the other side of which is electrically connected to said connector means, an electric motor mechanically connected to the take-up reel and adapted to draw the insulated wire through the sparker device, and a source of power for operating the electric motor, the improvement which comprises an electric relay having normally open electric contacts and an electric coil adapted to close said contacts when said coil is energized, a source of power for energizing the coil of said relay, and a second connector means adapted to be electrically connected to the other end of the conductor of the insulated wire, said source of power for the electric motor being connected to said electric motor through the electric contacts of said relay, said first connector means being connected to said second connector means through the electric coil of said relay, and said power source for the coil of said relay being connected in series between said coil and one of said connector means, whereby operation of the electric motor is permitted only when there is a good electric contact established between the ends of the metal conductor and the respective connector means.

3. In apparatus for testing the insulation of insulated wire comprising a pay-off reel from which the wire is unwound while being tested, a take-up reel upon which the wire is wound while being tested, a sparker device disposed between the pay-off reel and the take-up reel, first connector means on said take-up reel adapted to be electrically connected to one end of the conductor of the insulated wire, a high voltage source one side of which is electrically connected to the sparker device and the other side of which is electrically connected to said connector means, an electric motor mechanically connected to the take-up reel and adapted to draw the insulated wire through the sparker device, and a source of power for operating the electric motor, the improvement which comprises a relay having normally open electric contacts and an electric coil adapted to close said contacts when said coil is energized, a source of power for energizing the electric coil of said relay, and a second connector means on the pay-off reel adapted to be electrically connected to the other end of the conductor of the insulated wire, the source of power for the electric motor being connected to said electric motor through the normally open contacts of said relay, said first connector means being electrically connected to the second connector means through the coil of said relay, and said power source for the coil of said relay being connected in series between said coil and one of said connector means, whereby operation of the electric motor is permitted only when a good electric contact is established between the ends of the conductor of the insulated wire being tested and the respective connector means.

4. In apparatus for testing the insulation of insulated wire comprising a pay-off reel from which the wire is unwound while being tested, a take-up reel upon which the wire is wound while being tested, a sparker device disposed between the pay-off reel and the take-up reel, a first connector member on said take-up reel adapted to be electrically connected to one end of the conductor of the insulated wire, a slip ring mounted to rotate with the take-up reel and electrically connected to said connector member, a stationary take-up reel brush in contact with the slip ring, a high voltage source one side of which is electrically connected to the sparker device and the other side of which is electrically connected to said connector member, an electric motor mechanically connected to the take-up reel and adapted to draw the insulated wire through the sparker device, and a source of power for operating the electric motor, the improvement which comprises a relay having normally open electric contacts and an electric coil adapted to close said contacts when said coil is energized, a source of power for energizing the coil of said relay, a second connector member on the pay-off reel adapted to be electrically connected to the other end of the conductor of the insulated wire, a pay-off reel slip ring mounted to rotate with the pay-off reel and electrically connected to said second connector member, a stationary pay-off reel brush in contact with said pay-off reel slip ring, and insulator means insulating the pay-off reel and pay-off reel brush from ground, said source of power for the electric motor being connected to the electric motor through the contacts of said relay, said pay-off reel brush being connected to the take-up reel brush through the coil of said relay, and said source of power for the coil of said relay being connected in series between said coil and one of said brushes.

5. Apparatus for testing the insulation of insulated wire comprising a pay-off reel from which the wire is unwound while being tested, first connector means on said pay-off reel adapted to be electrically connected to one end of the conductor of the insulated wire, insulator means electrically insulating said pay-off reel and said connector means from ground, a take-up reel upon which the wire is wound while being tested, a second connector means on said take-up reel electrically connected to ground and adapted to be electrically connected to the other end of the conductor of the insulated wire, a sparker device disposed between the pay-off reel and the take-up reel, a high voltage source one side of which is electrically connected to the sparker device and the other side of which is electrically connected to ground, an electric motor mechanically connected to the take-up reel and adapted when energized to draw the insulated wire through the sparker device, a source of power for energizing the electric motor, an electric relay having normally open electric contacts and an electric coil adapted to close said contacts when said coil is energized, and a source of power for the coil of said relay, said first connector means being connected to said second connector means through the coil of said relay, said source of power for the electric motor being connected to said motor through the normally open contacts of said relay, and said source of electric power for the coil of said relay being connected in series between said coil and one of said connector means, whereby operation of the electric motor is possible only when a good electric contact is established between each end of the metal conductor of the insulated wire and the respective connector means.

References Cited in the file of this patent

UNITED STATES PATENTS

| | | |
|---|---|---|
| 1,952,582 | Cary | Mar. 27, 1934 |
| 2,483,915 | Lines | Oct. 4, 1949 |
| 2,643,285 | Cranford | June 23, 1953 |